United States Patent [19]

Muta et al.

[11] Patent Number: 5,387,478
[45] Date of Patent: Feb. 7, 1995

[54] HYDROGEN STORAGE ELECTRODE AND PROCESS FOR PRODUCING THE SAME

[75] Inventors: Mitsuharu Muta, Kariya; Tetsuo Sakai, Amagasaki; Hiroshi Miyamura, Shin-senni-nishi; Nobuhiro Kuriyama, Osaka; Itsuki Uehara, Osaka, all of Japan

[73] Assignees: Kabushiki Kaisha Toyoda Jidoshokki Seisakusho, Kariya; Government Industrial Research Institute, Osaka, both of Japan

[21] Appl. No.: 92,212

[22] Filed: Jul. 15, 1993

[30] Foreign Application Priority Data

Jul. 21, 1992 [JP] Japan .................. 4-194212

[51] Int. Cl.⁶ .............................................. H01M 4/38
[52] U.S. Cl. ...................................... 429/59; 429/101; 429/218; 29/623.5; 427/115; 420/900
[58] Field of Search .................. 429/40, 41, 59, 101; 29/623.5; 427/115; 420/900

[56] References Cited

U.S. PATENT DOCUMENTS 5,104,753  4/1992  Sakai et al. ................ 429/40
5,242,766  9/1993  Furukawa .................... 429/59

Primary Examiner—Stephen Kalafut
Assistant Examiner—M. Nuzzolillo
Attorney, Agent, or Firm—Brooks Haidt Haffner & Delahunty

[57] ABSTRACT

A hydrogen storage electrode for use as an anode of an alkaline battery and a process for producing such electrode are disclosed. According to the process, firstly particles of hydrogen storage alloy powder with maximum particle size of 50 $\mu$m is prepared. The alloy powder particles are then made into microcapsules by electroless plating with copper amounting to 10%–20% by weight with respect to the sum of the alloy powder and the plating copper. With an electric current collector placed in contact with the copper-plated alloy powder set in a die cavity of a molding press, the molding dies are closed to press and the copper-plated powder and the current collector for bonding them together thereby to form the hydrogen storage electrode. Pressure exerted during the pressing is applied to such an extent that the porosity of the resulting compact of the pressed alloy powder falls in the range of 10% to 25%.

11 Claims, 2 Drawing Sheets

HYDROGEN STORAGE ELECTRODE AND PROCESS FOR PRODUCING THE SAME

BACKGROUND OF THE INVENTION

1. Field of the Invention

The present invention relates to a hydrogen storage electrode for use as an anode of an alkaline battery, and also to a process for producing the same.

2. Description of the Prior Art

Process for producing a hydrogen storage electrode can be grouped roughly into two methods according to whether or not sintering is applied in the process. Namely, one is sintering method as described, e.g., in Publication of Unexamined Japanese Patent Application No. 1-132048 (1989), according to which hydrogen storage alloy powder set in contact with an electric current collector is bonded together by sintering under a temperature of about 1,000° C. while the former alloy powder is held pressed against the latter current collector.

The other is non-sintering method as disclosed, e.g., by Publications of Unexamined Japanese Patent Applications No. 2-278659 (1990) and No. 3-98261 (1991). According to this method, hydrogen storage alloy powder is mixed with copper powder which amounts to about as many as 4 to 5 times by weight as the alloy powder and serves as a conductivity aid, and the mixture is pressed onto a current collector for bonding thereby to form a hydrogen storage electrode. Alternatively, the mixture of the hydrogen storage alloy powder and the conductivity aid may be mixed further with a binder such as fluororesin powder and then pressed and bonded to a current collector in the atmosphere of about 300°.

It is noted, however, that the production process according to the sintering method is complicated and hence costly and also that the hydrogen storage electrode made in the non-sintering method is poor not only in conductivity, but also in the mechanical bonding strength between particles of the hydrogen storage alloy powder and also between the alloy powder and the current collector.

According to the non-sintering method in which a large amount of conductivity aid is used, discharge capacity per given weight or volume of the resulting electrode will be reduced, and the use of fluororesin as a binder will increase the internal electrical resistance of the electrode. If only a less amount of binder is added with an attempt to prevent such an increase of the resistance, it will affect the mechanical bonding strength and hence the charge and discharge cycle life of the electrode. Additional heating to a substantially high temperature may be performed to secure the bonding strength, but only at the sacrifice of additional cost.

SUMMARY OF THE INVENTION

It is an object of the present invention, therefore, to provide a hydrogen storage electrode which can present excellent capabilities of the discharge capacity and the charge and discharge cycle life when it is used as an anode of a alkaline battery and also a process for manufacturing such electrode without complicating the production.

The process for producing a hydrogen storage electrode according to the present invention includes steps of preparing hydrogen storage alloy powder with maximum particle size of 50 $\mu$m, plating the alloy powder with copper amounting to 10% to 20% by weight with respect to the sum of the alloy powder and the plating copper, and pressing the copper-plated alloy powder and an electric current collector set in contact therewith for bonding to such an extent that the porosity of the compact of the alloy powder in the resulting electrode falls in the range of 10% to 25%.

A battery with a hydrogen storage electrode made of alloy powder whose maximum particle size was greater than 50 $\mu$m offered only a shorter cycle life.

The cycle life of a battery with an electrode whose copper plating was less than the above 10% by weight was disadvantageously short, and a battery with an electrode whose copper plating was greater than the above 20% by weight showed a poor discharge capacity.

The discharge capacity of a battery was lower when the porosity of its electrode was less the above 10% and the cycle life was shorter when the porosity was more than the above 25%. The porosity is defined as the ratio of porous volume of the copper-plated alloy powder compact to the volume of that compact.

The hydrogen storage electrode according to the invention can be produced more easily than those electrodes which have been made by the above conventional sintering method or non-sintering method using fluororesin as binder. Additionally, a battery using the electrode made by the process of the invention was found to offer better characteristics in the discharge capacity and cycle life than a battery using a conventional electrode containing fluororesin as binder and a large amount of copper as conductivity aid.

It is presumed that the ductility of copper used for plating the hydrogen storage alloy powder can help to achieve intimate contact of powder particles and to increase the bonding strength between the powder particles and also between the alloy powder and the electric current collector.

DETAILED DESCRIPTION OF PREFERRED EMBODIMENTS

Figure 1:
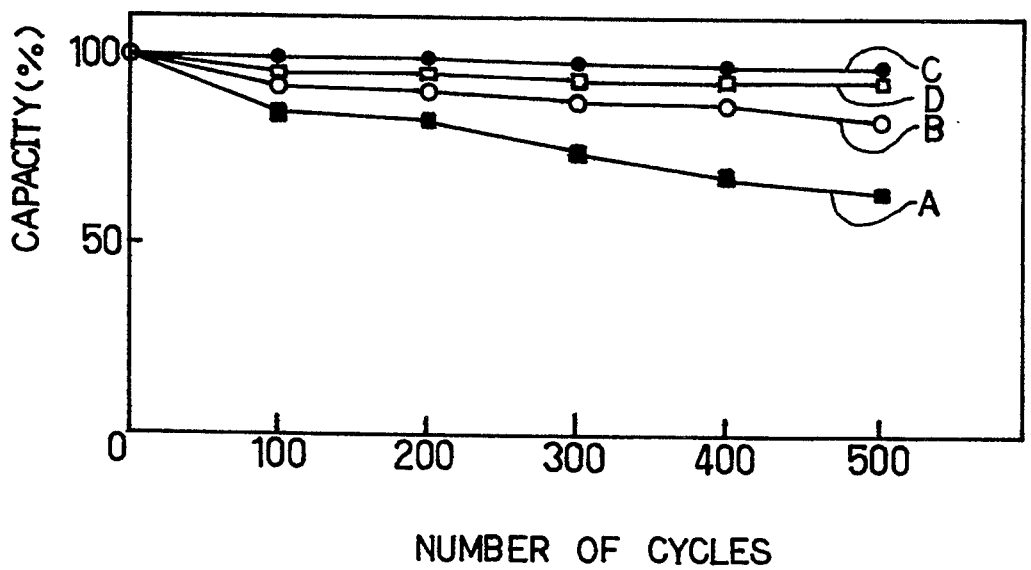
FIG. 1 is a graph showing the cycle lives of batteries with hydrogen storage electrodes made according to the first embodiment in which alloy powders of different particle size distributions were used.

The following will describe preferred embodiments of the hydrogen storage electrode and the process for producing such electrode.

1. First Embodiment

Hydrogen storage alloy having the composition of MmNi3.5Co0.7Al0.8 was mechanically pulverized into particles of powder. Then, passing the particles of alloy powder through standard sieves with four different meshes 150×150 $\mu$m, 105×105 $\mu$m, 50×50 $\mu$m and 20×20 $\mu$m, the alloy powder was sorted into four different powders according to the maximum nominal particle size of each powder in order to make four different electrodes "A"–"D" which will be specified hereinafter. It should be noted that some particles slightly larger than the nominal size defined by the sieve mesh may be included in each alloy powder because of inevitable inaccuracy of each sieve mesh.

Then, the alloy powder was made into microcapsules by electroless plating with copper amounting to 10% by weight with respect to the sum of the alloy powder and the plating copper.

After the copper-plated alloy powder was dried sufficiently, a predetermined amount of the copper-plated alloy powder was put in a layer into a cavity formed in a stationary lower die of a molding press and having a shape conforming to an electrode to be made. An electric current collector made of nickel expand metal was placed on the layer of copper-plated alloy powder in the cavity, and then the press dies were closed to cold-press for bonding the copper-plated particles of powder together into a compact, as well as the current collector to the compact. This cold pressing resulted in an electrode in process with a size of 40×30 mm, a thickness of 0.6 mm and a porosity of 25%. Using the above method, four kinds of electrodes in process were provided which included alloy powder with different maximum particle size. For the sake of reference, these electrodes made of powders with maximum particle sizes 150 $\mu$m, 105 $\mu$m, 50 $\mu$m and 20 $\mu$m were named as "A", "B", "C" and "D", respectively. Incidentally, the porosity of the compact was figured out as follows. Firstly, the volume of the nickel expand metal (or weight/specific gravity) was subtracted from the electrode volume to find the volume of copper-plated alloy powder, and the weight of the alloy powder was found by subtracting the expand metal weight from the electrode weight. Then, the specific gravity of the copper-plated alloy powder, as obtained by dividing its weight by its volume, was divided by the theoretical specific gravity of the copper-plated alloy powder to find the porosity.

Each of these electrodes in process was assembled to a sintered nickel cathode having a sufficiently large capacity with a non-woven nylon fabric held therebetween and the assembly was immersed in an electrolyte of potassium hydride solution having a specific gravity of 1.26. Thus, a negative pole limited battery was made. After the electrode was activated sufficiently by repeating charging at 0.4 CmA for three hours to 120% charge and discharging at 0.2 CmA to a cut off voltage of 0.8V under a temperature of 20° C., the discharge capacity per electrode volume was measured. Subsequently, after the electrode was activated, charging at 0.4 CmA for three hours to 120% charge and discharging at 0.4 CmA to a cut off voltage of 0.8V were repeated under a temperature of 20° C. to determine the cycle life of each electrode.

TABLE 1

| Discharge capacity per electrode volume | |
|---|---|
| Electrode | Discharge Capacity (mAh/CC) |
| A | 830 |

TABLE 1-continued

| Discharge capacity per electrode volume | |
|---|---|
| Electrode | Discharge Capacity (mAh/CC) |
| B | 870 |
| C | 950 |
| D | 960 |

TABLE 1 provides the discharge capacities per electrode volume of batteries with the electrodes "A"–"D", respectively, and FIG. 1 shows the cycle lives, i.e., the rate at which the battery capacity is decreased with an increasing number of charge/discharge cycles.

As it is apparent from TABLE 1, the smaller the particle size is, the higher the discharge capacity per electrode volume is. Microscopic observation of electrode surface revealed that particles of 60 $\mu$m or more of the copper-plated alloy powder was cracked after the alloy powder was pressed to the electric current collector. It can be thought that the cracks found in the electrodes made of alloy powder of larger particle size were responsible for poor conductivity and hence a lower discharge capacity of batteries having such electrodes.

It was presumed that an increase of copper plating amount over 10% by weight would make the electrode less susceptible to such cracking.

It was presumed also that a decrease of the porosity below 25% by application of a stronger pressure in the pressing operation would improve the mechanical bonding strength of the copper-plated alloy powder and the electrode would be made less susceptible to cracking, accordingly.

As seen from FIG. 1, batteries with the electrodes "A" and "B" exhibited a noticeable drop in the capacity in the cycle life testing, as compared with batteries with the electrodes "C" and "D" made of smaller-size powder particles. It can be thought that, with the electrodes "A" and "B", the alloy particles tended to become finer by the repeated charge and discharge cycles, which resulted in deterioration of the holding strength of the bonded alloy particles and hence allowed part of the particles to come off from such electrodes.

2. Second Embodiment

In the second embodiment of the hydrogen storage electrode, four different electrodes were prepared which were made in the same method and had the same alloy composition as the electrodes "A"–"D" in the first embodiment, but differed therefrom in that the maximum nominal particle size of the alloy powder was 50 $\mu$m only and the copper plating was applied with different percentages by weight. Namely, 5%, 10%, 20% and 25% by weight of copper were plated to the alloy powders and the resulting electrodes were referred to as "E", "F", "G" and "H", respectively.

As specimens intended for comparison with these electrodes "E"–"H", three different hydrogen storage electrodes "I"–"K" were prepared which were free from copper plating, but mixed with 20% by weight of conductivity aid. The electrodes mixed with copper powder, nickel powder and carbon powder as the conductivity aid were labeled as "I", "J" and "K", respectively. All the electrodes "E"–"K" were formed to the same 25% porosity.

Using these electrodes "E"–"K", testing was conducted to determine the discharge capacity per electrode volume and the cycle life in the same methods as used in the first embodiment. TABLE 2 shows the discharge capacities and FIG. 2 the cycle lives of batteries with the electrodes "E"–"K", respectively.

TABLE 2

| Electrode | Discharge capacity per electrode volume Discharge Capacity (mAh/CC) |
|---|---|
| E | 1100 |
| F | 1080 |
| G | 930 |
| H | 880 |
| I | 580 |
| J | 720 |
| K | 550 |

For the sake of further comparison with the electrodes "E"–"H", hydrogen storage electrodes of the same alloy composition were made in the same method as the above electrodes "E"–"K", but using alloy powders with particle size of 20 µm or less. The testing results of these electrodes showed substantial no difference from those obtained from testing the electrodes "E"–"K".

Figure 2:
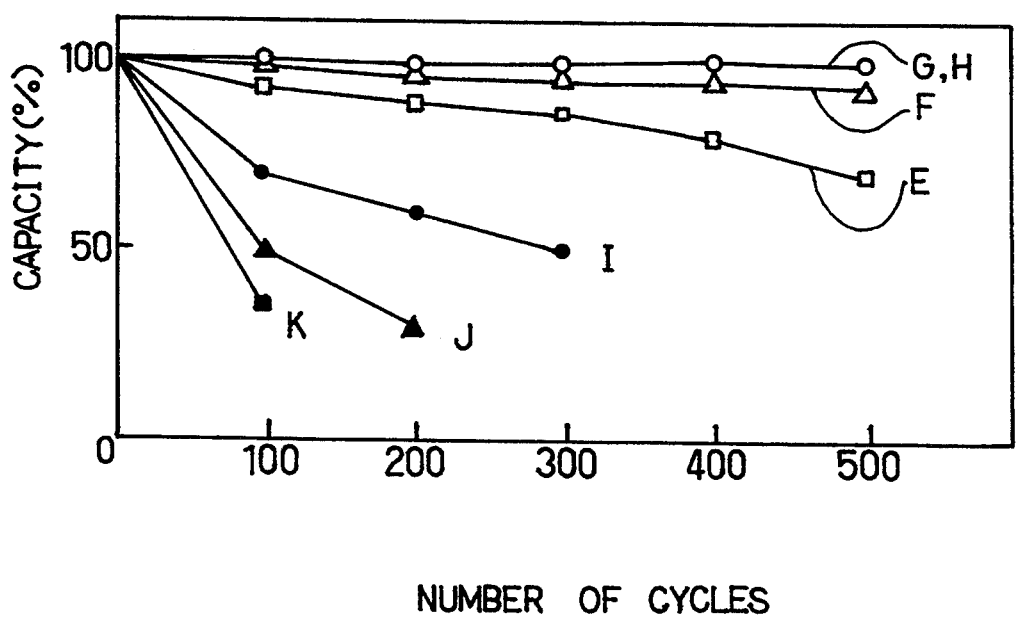
FIG. 2 is a graph showing the cycle lives of batteries with hydrogen storage electrodes made according to the second embodiment in which alloy powders with different copper plating amounts in percentage by weight were used. The graph also provides the cycle lives of batteries with electrodes without copper plating, but containing a predetermined amount of copper, nickel and carbon powder, respectively, as conductivity aid.

As seen clearly from TABLE 2 and FIG. 2, batteries with the electrodes "I"–"K" showed less discharge capacities per electrode volume and shorter cycle lives than batteries with the electrodes "E"–"H". It can be thought that such discharge capacity and cycle life resulted from poor mechanical bonding strength between the alloy powder particles and poor conductivity in the electrodes "I"–"K", which affected the cycle life and the discharge capacity, respectively, in contrast to the electrodes "E"–"H" in which ductile layers of copper plating were pressed into intimate contact with each other to thereby wrap and hold the alloy powder particles securely, thus improving the conductivity.

With reference to the electrode "E" having 5% by weight of copper plating, however, its smaller copper-plating amount resulted in poor contact between the powder particles and hence shorter cycle life, although it provided good characteristics in the discharge capacity. With the electrode "H" having 25% by weight of copper plating, on the other hand, its larger amount of copper reduced the discharge capacity.

3. Third Embodiment

Figure 3:
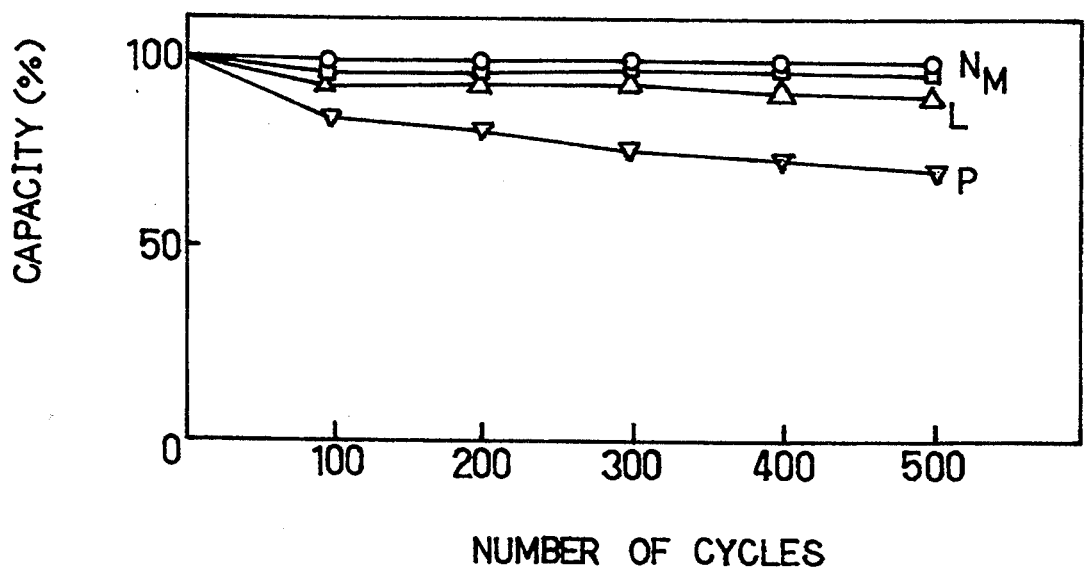
FIG. 3 is a graph showing the cycle lives of batteries with hydrogen storage electrodes made according to the third embodiment in which alloy powders were pressed into compacts to different porosities.

In still another embodiment of the hydrogen storage electrode, four different electrodes "L", "M", "N" and "P" were prepared which were made of the hydrogen storage alloy powders of the same composition and in the same method as the electrodes "A"–"D" in the first embodiment, but differing therefrom in that the maximum particle size was 50 µm only, 20% by weight of copper plating was applied, and also that the alloy powders were pressed to porosities 8%, 10%, 25% and 30%, respectively. Using these electrodes "L"–"P", testing for the discharge capacity per electrode volume and the cycle life was conducted in the same methods as in the first embodiment. TABLE 3 shows the discharge capacities per electrode volume and FIG. 3 provides the cycle lives of these electrodes, respectively.

TABLE 3

| Electrode | Discharge capacity per electrode volume Discharge Capacity (mAh/CC) |
|---|---|
| L | 760 |
| M | 910 |
| N | 930 |
| P | 830 |

Figure 4:
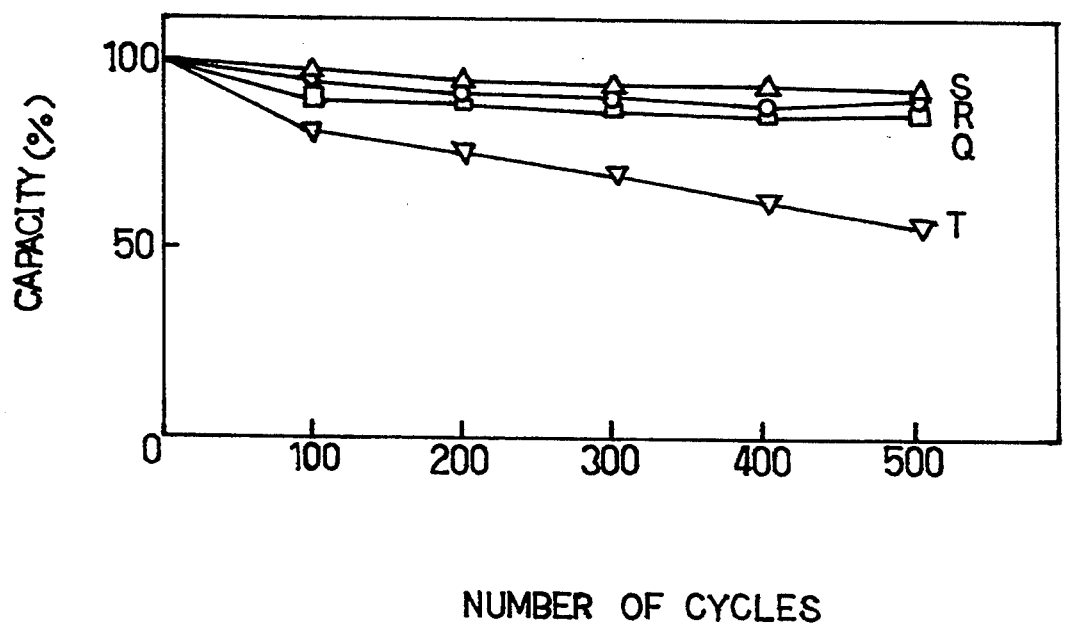
FIG. 4 is a graph showing the cycle lives of batteries with the same hydrogen storage electrodes made according to the third embodiment, but containing a different copper plating amount in percentage by weight.

Furthermore, four different hydrogen storage electrodes "Q"–"T" were made of the same alloy composition and in the same method as the above electrodes "L"–"P", but with 10% by weight of copper plating and different porosities of 8%, 10%, 25% and 30%, respectively. These electrodes were tested to determine the discharge capacity and the cycle life in the same method as in the first embodiment. FIG. 4 shows the discharge capacities per electrode volume and TABLE 4 shows the cycle lives of these hydrogen storage electrodes "Q"–"T", respectively.

TABLE 4

| Electrode | Discharge capacity per electrode volume Discharge Capacity (mAh/CC) |
|---|---|
| Q | 880 |
| R | 1050 |
| S | 1080 |
| T | 870 |

As apparent from FIGS. 3, 4 and TABLES 3, 4, the electrodes "M" and "R" with the porosity of 10% and the electrodes "N" and "S" with the porosity of 25% exhibited excellent characteristics both in the discharge capacity and the cycle life. This is because the electrodes with 10% or less porosity allow only a smaller amount of electrolyte to permeate thereinto and, therefore, the contact between the electrolyte and the alloy powder and hence the effective reaction area becomes less, with the result that the utilization of the alloy powder was reduced. With the electrodes with 25% or more porosity, on the other hand, the electrode volume is larger and the bonding area between the powder particles is less, so that the electric resistance becomes higher and the mechanical strength of the electrode poor, with the result that the discharge capacity and the cycle life are reduced.

While the invention has been described with reference to the specific embodiments, it is to be understood that the present invention can be practiced in various changes and modifications without departing from the spirit or scope thereof, as exemplified below.

Cold-pressing for bonding of the hydrogen storage powder and the electric current collector in the above-described embodiments may be substituted with hot-pressing.

Though molding of the electrode is accomplished by mechanical pressing the copper plating layers, without using conductivity aid or binder, in the above embodiments, a small amount of conductivity aid or binder may be added. Nickel or copper powder may be used as the conductivity aid, and PVA (polyvinyl alcohol), CMC (carboxymethyl cellulose) or PTFE (polytetrafluoroethylene) may serve for the purpose of binding.

What is claimed is:

1. A process for producing a hydrogen storage electrode comprising in combination the steps of preparing particles of hydrogen storage alloy powder with a maximum particle size of 50 µm, plating said particles of alloy powder with copper amounting to 10% to 20% by weight with respect to the sum of the alloy powder and the plating copper, and pressing in the absence of a binder the copper-plated alloy powder and an electric current collector set in contact therewith for bonding the plated particles to each other and to the current collector compacting the plated powder to such an extent that the porosity of the pressed alloy powder in the resulting electrode falls in the range of 10% to 25%.

2. A process for producing a hydrogen storage electrode according to claim 1, wherein said step of preparing particles of hydrogen storage alloy powder includes mechanically pulverizing an alloy with the composition of MmNi3.5Co0.7Al0.8 into particles of powder.

3. A process for producing a hydrogen storage electrode according to claim 1, wherein said electric current collector is made of nickel.

4. A process for producing a hydrogen storage electrode according to claim 1, further comprising the step of adding a conductivity aid to said copper-plated allow powder prior to said pressing step.

5. A process for producing a hydrogen storage electrode comprising in combination the steps of preparing particles of hydrogen storage alloy powder with a maximum particle size of 50 μm, plating said particles of alloy powder with copper amounting to 10% to 20% by weight with respect to the sum of the alloy powder and the plating copper, and pressing in the absence of a binder the copper-plated alloy powder and an electric current collector set in contact therewith in a die cavity of a molding press having a shape conforming to the electrode for bonding the plated particles to each other and to the current collector, compacting the plated powder to such an extent that the porosity of the pressed alloy powder in the resulting electrode falls in the range of 10% to 25%.

6. A process for producing a hydrogen storage electrode according to claim 5, wherein said step of preparing particles of hydrogen storage alloy powder includes mechanically pulverizing an alloy with the composition of MmNi3.5Co0.7Al0.8 into particles of powder.

7. A process for producing a hydrogen storage electrode according to claim 5, wherein said electric current collector is made of nickel.

8. A process for producing a hydrogen storage electrode according to claim 5, further comprising the step of adding a conductivity aid to said copper-plated alloy powder prior to said pressing step.

9. A process for producing a hydrogen storage electrode according to claim 5, wherein said pressing step involves cold-pressing.

10. A process for producing a hydrogen storage electrode according to claim 5, wherein said pressing step involves hot-pressing.

11. A hydrogen storage electrode for use as an anode of an alkaline battery comprising hydrogen storage means, and an electric current collector bonded to said hydrogen storage means, said hydrogen storage means including particles of alloy powder with a maximum particle size of 50 μm, said particles of alloy powder having been plated with copper in an amount of 10% to 20% by weight with respect to the sum of said alloy powder and said plating copper, said hydrogen storage electrode being free of binder and having a porosity falling within the range of 10% to 25%.

* * * * *